UNITED STATES PATENT OFFICE.

FREDERICK LEPORIN, OF NEW YORK, N. Y., ASSIGNOR TO AGNES LEPORIN, OF SAME PLACE.

IMPROVEMENT IN INCRUSTATION-PREVENTIVES.

Specification forming part of Letters Patent No. 219,742, dated September 16, 1879; application filed March 22, 1879.

*To all whom it may concern:*

Be it known that I, FREDERICK LEPORIN, of the city of New York, in the county of New York and State of New York, have invented certain new and useful Improvements in Compounds to Prevent Incrustation; and I do hereby declare that the following is a full, clear, and exact description of the construction and operation of the same.

My invention relates to a compound or solution the object of which is to remove scale from boilers, to prevent the formation of scale in boilers, and to neutralize acid, mine, and sulphur waters when used in steam-boilers; and the novelty consists in the preparation, as more fully hereinafter specified.

This preparation not only prevents the formation of a scale or incrustation, but in time will soften, dissolve, and shell off that already formed.

In carrying out my invention, I first make a solution of sixteen ounces of oil of black pepper and eight ounces of seventy-five per cent. alcohol, and in the alcohol dissolve as much bromide of potassium as the alcohol will take up; then add four ounces of quinine to the alcohol, and mix all the above together. In one gallon of water I then boil four (4) pounds of cutch until it is thoroughly dissolved, cool it, and add salt in the proportion of one pound to every five gallons. Finally, to this last solution I add the first solution in the proportion of one ounce of the first to every five gallons of the dissolved cutch, and the preparation is ready for use.

The application is made by simply placing in each ordinary-sized boiler about two gallons (more or less) of the preparation.

I claim as my invention—

The composition for preventing incrustation herein described, consisting of alcohol, oil of black pepper, quinine, bromide of potassium, cutch, water, and salt in the proportions specified, for the purpose set forth.

In testimony that I claim the above I have hereunto subscribed my name in the presence of two witnesses.

FREDERICK LEPORIN.

Witnesses:
SAML. CAMPBELL,
HOWARD CAMPBELL.